United States Patent [19]

Sassmannshausen et al.

[11] Patent Number: 5,507,584
[45] Date of Patent: Apr. 16, 1996

[54] SWIVEL JOINT WITH CLAMPING DEVICE

[75] Inventors: Werner Sassmannshausen; Karl-Heinz Menzel, both of Bad Berleburg-Aue, Germany

[73] Assignee: Sonor Johs. Link GmbH, Bad Berleburg, Germany

[21] Appl. No.: 240,025

[22] Filed: May 9, 1994

[30] Foreign Application Priority Data

May 8, 1993 [DE] Germany ............... 93 07 020.9 U

[51] Int. Cl.⁶ ................................................. F16D 3/00
[52] U.S. Cl. .................... 403/78; 403/87; 403/110; 248/188.6; 84/421
[58] Field of Search .................... 403/78, 87, 94, 403/96, 101, 102, 92, 91, 93, 110, 85, 88, 354; 248/166, 188.6, 167; 84/412, 421

[56] References Cited

U.S. PATENT DOCUMENTS

| | | | |
|---|---|---|---|
| 679,058 | 7/1901 | Mellen | 403/94 X |
| 1,829,551 | 10/1931 | Wambsgans | 403/93 |
| 2,501,581 | 3/1950 | Rieger | 403/96 X |
| 2,696,996 | 12/1954 | Engelhardt | 403/91 X |
| 4,640,175 | 2/1987 | Hoshino | 84/421 |
| 4,747,569 | 5/1988 | Hoshino | 84/421 X |
| 4,869,147 | 9/1989 | Hoshino | 84/421 |
| 4,903,570 | 2/1990 | Sassmannshausen et al. | 84/421 |

FOREIGN PATENT DOCUMENTS 3919577  12/1990  Germany.

*Primary Examiner*—Brian K. Green
*Assistant Examiner*—Harry C. Kim
*Attorney, Agent, or Firm*—Friedrich Kueffner

[57] ABSTRACT

A swivel joint for an essentially rod-shaped object, such as, a tripod, a leg or a similar support or holder for devices, particularly for musical percussion instruments, includes two joint members which are movable relative to each other and can be locked by a clamping device. The clamping device is constructed in such a way that it can simultaneously be used for clamping the rod-shaped object. In an annular end face facing away from the stationary joint member, the ring has diametrically oppositely arranged prismatic radial recesses which correspond to openings in the wall of the sleeve. When the radial recesses and the wall openings are in an aligned position, the rod-shaped object can be inserted into the swivel joint, such that the rod-shaped object extends through the radial recesses of the ring and the axial wall openings of the sleeve.

5 Claims, 4 Drawing Sheets

SWIVEL JOINT WITH CLAMPING DEVICE

BACKGROUND OF THE INVENTION

1. Field of the Invention

The present invention relates to a swivel joint for an essentially rod-shaped object, such as, a tripod, a leg or a similar support or holder for devices, particularly for musical percussion instruments. The swivel joint includes two joint members which are movable relative to each other and can be locked by a clamping device.

2. Description of the Related Art

Tripods, legs or similar supports or holders which have a swivel joint of this type have become known from DE 39 19 577 A1. They are used particularly in connection with musical percussion instruments, for example, idiophones and membranophones. As a rule, the legs, for example, of the large drum or bass drum of drum sets are arranged in such a way that, in the position of use, they project beyond the periphery of the drum and support the large drum together with the corresponding foot machine on the floor on three points. In addition, three legs which are of the same construction are used for mounting such drums (standing tom-tom drums) of drum sets in which the longitudinal axis of the resonator shell is aligned essentially vertically, so that the head skin mounted across the resonator shell assumes at least approximately a horizontal position. In that case, the legs are arranged distributed approximately uniformly over the circumference of the resonator shell.

The purpose of the swivel joints of the respective tripod, leg or similar support or holder is to improve the possibilities for transporting the various musical percussion instruments. For example, the legs of a standing tom-tom drum are swiveled into a position extending parallel to the resonator shell; at the location of use, the legs are then again swiveled back into the position of use. To ensure that the musical percussion instrument assumes the individually determined adjustment position when it is mounted, the known swivel joint additionally can be provided with an indicating device which extends about the joint axis at least over a limited angle of rotation.

SUMMARY OF THE INVENTION

Therefore, it is the primary object of the present invention to improve a swivel joint of the above-described type. In particular, a greater variety of uses of the swivel joint should become possible.

In accordance with the present invention, the clamping device is constructed in such a way that it can simultaneously be used for clamping the rod-shaped object.

The present invention makes it possible in a surprisingly simple manner that, after the clamping action has been released, the rod-like object mounted in the swivel joint can be swiveled and is slidable in the direction of its longitudinal axis. Accordingly, it is not necessary to provide a second clamping unit for ensuring this double function of the swivel joint. Moreover, it may additionally possible to release the clamping action only to such an extent that a displacement of the rod-shaped object is possible, while swiveling of the rod-shaped object is not possible.

In accordance with an advantageous further development of the present invention, a ring forming the movable joint member is slid onto a sleeve which is rotatably arranged in a stationary joint member. In an annular end face facing away from the stationary joint member, the ring has diametrically oppositely arranged prismatic radial recesses which correspond to openings in the wall of the sleeve. To simplify the manufacture, the openings preferably are in the shape of oblong holes. When the radial recesses and the wall openings are in an aligned position, the rod-shaped object can be inserted into the swivel joint, such that the rod-shaped object extends through the radial recesses of the ring and the axial wall openings of the sleeve. Since the sleeve is rotatably mounted in the stationary joint member, the rod-shaped object can be easily swiveled after the clamping action has been released. This is because the sleeve and the ring can then be easily turned together with the rod-shaped object. Simultaneously, the rod-shaped object can be displaced as desired in the longitudinal direction thereof. On the other hand, if the rod-shaped object is to be secured in a desired position, the rod-shaped object only has to be pressed into the radial recesses of the ring, which simultaneously causes the swivel joint to be tightened.

In accordance with another recommended feature, the sleeve has at its free outer end a threaded portion, wherein a knurled nut can be screwed onto the threaded portion against the force of a pressure element, preferably a pressure spring, which rests against the rod-shaped object. Simply by screwing the knurled nut onto the external thread of the sleeve, the rod-shaped object and the joint members of the swivel joint can be either tightened or released, wherein the release is effected by loosening the knurled nut in order to release the clamping action.

In accordance with another advantageous feature, a plastic disk is arranged on the sleeve between the ring and the knurled nut, wherein the plastic disk rests against the rod-shaped object. This makes it possible to transmit the clamping force applied when screwing on the knurled nut over a large area onto the rod-shaped object which is clamped in the prismatic radial recesses.

In accordance with an advantageous further development of the invention, the ring can be locked relative to the stationary joint member. For this purpose, preferably a ball snap-in connection is provided. This snap-in connection is composed, for example, of two balls which, in relation to the vertical axis, are pressed at the top and at the bottom into the annular end face of the ring facing the stationary joint member, wherein corresponding locking recesses are provided in the adjacent annular end face of the stationary joint member. It is understood that the balls and locking recesses can also be arranged in the respectively other joint member. In the position of operation, i.e., when the balls are engaged in the locking recesses, the snap-in connection ensures a secure fastening of the rotatable joint member or ring.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there is illustrated and described a preferred embodiment of the invention.

DETAILED DESCRIPTION OF THE PREFERRED EMBODIMENT

Figure 1:
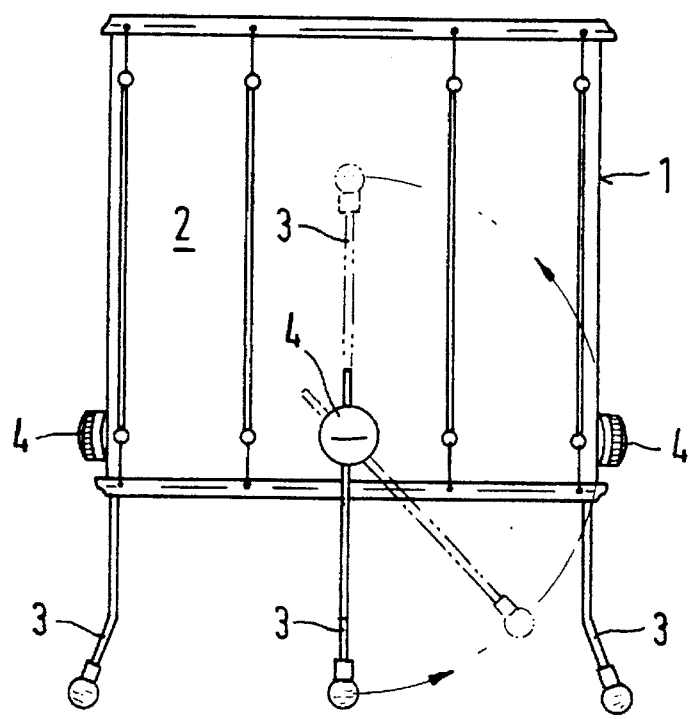
FIG. 1 is a schematic front view of a standing tom-tom drum provided with a swivel joint according to the present invention for swiveling the legs.
Figure 2:
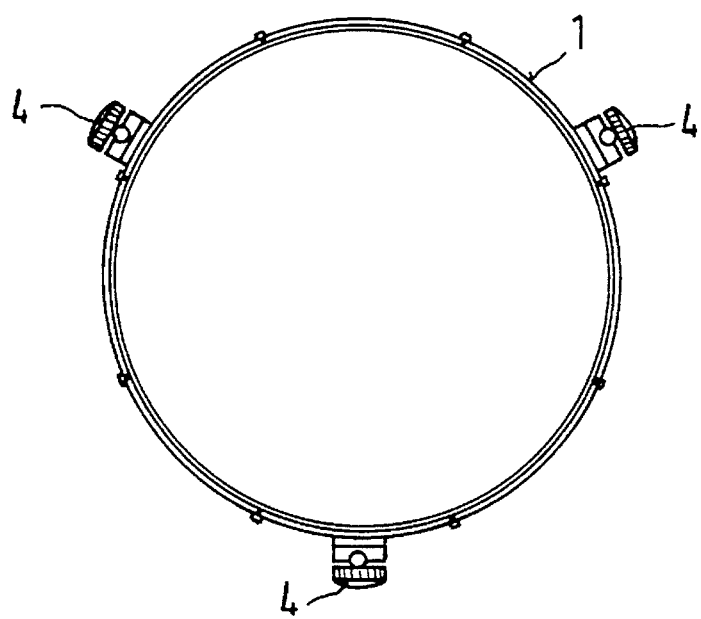
FIG. 2 is a top view of the standing tom-tom drum of FIG. 1.

The standing tom-tom drum 1 shown in FIGS. 1 and 2 of the drawing has three legs 3 which are arranged approximately uniformly distributed over the circumference of the resonator shell 2. The legs 3 are each connected to the resonator shell 2 by means of a swivel joint 4. The swivel joints 4 make it possible, for transporting the drum, to swivel the legs 3 from the position used during play to a position adjacent the resonator shell 2, as illustrated in broken lines in connection with the leg 3 shown in the middle of FIG. 1. Specifically, FIG. 1 shows an intermediate position of the leg and the completely swiveled end position of the leg. At a new location of use, the legs 3 are then swiveled back into the position of operation shown in FIG. 1 in solid lines.

Figure 3:
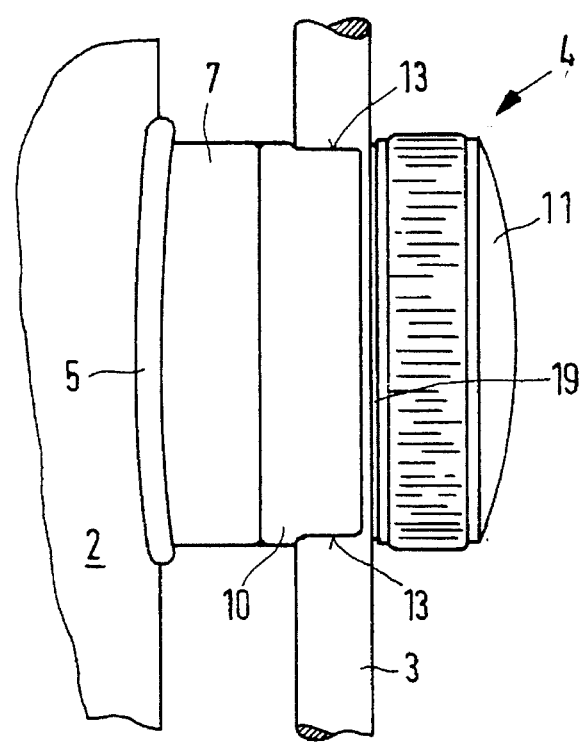
FIG. 3 is a partial side view, on a larger scale, showing a swivel joint in the clamping position mounted on a resonator shell of the standing tom-tom drum.
Figure 4:
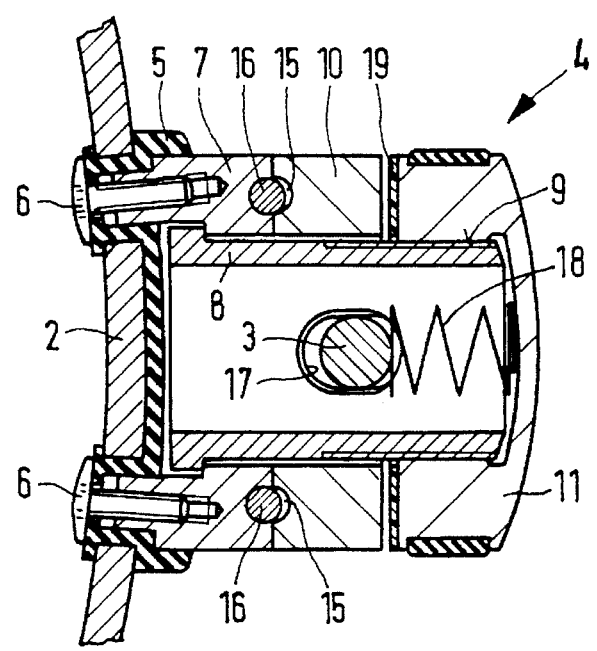
FIG. 4 is a cross-sectional view of the swivel joint of FIG. 3.
Figure 5:
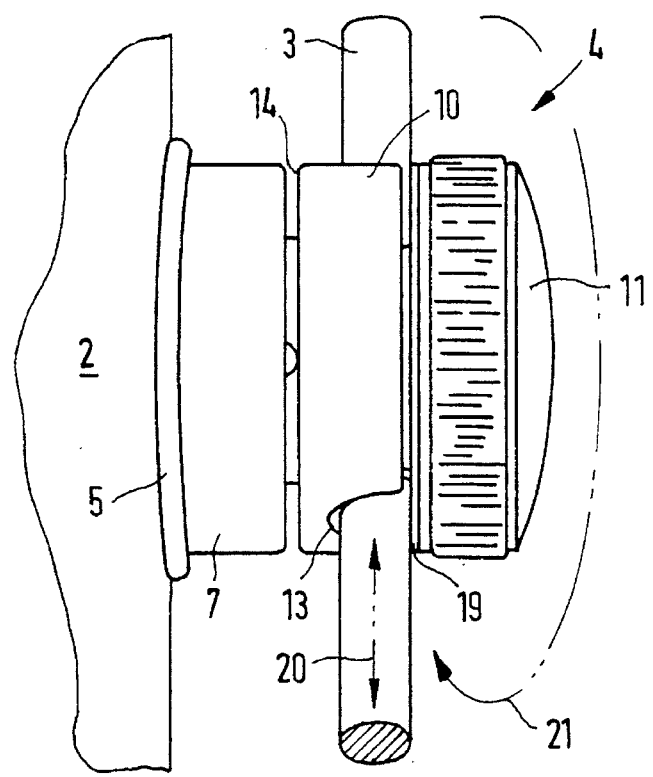
FIG. 5 is a side view corresponding to FIG. 3, however, with the swivel joint being released for swiveling the leg.
Figure 6:
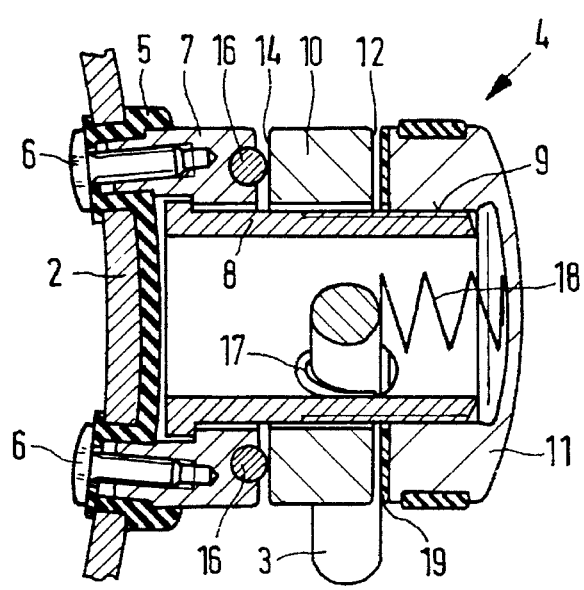
FIG. 6 is a cross-sectional view of the swivel joint of FIG. 5.

The swivel joint 4 shown in more detail in FIGS. 3 to 6 of the drawing includes a joint member 7 which is rigidly connected to the resonator shell 2 of the percussion instrument. As shown in FIGS. 4 and 6, the joint member 7 is fastened by means of screws 6 and a rubber bearing 5. The swivel joint 4 further includes a sleeve 8 which is rotatably arranged in the joint member 7, wherein the sleeve 8 is provided at its free forward end with an external threaded portion 9; a ring 10 forming the movable joint member of the swivel joint 4 is slid onto the sleeve 8. A knurled nut 11 is screwed onto the external threaded portion 9.

Figure 7:
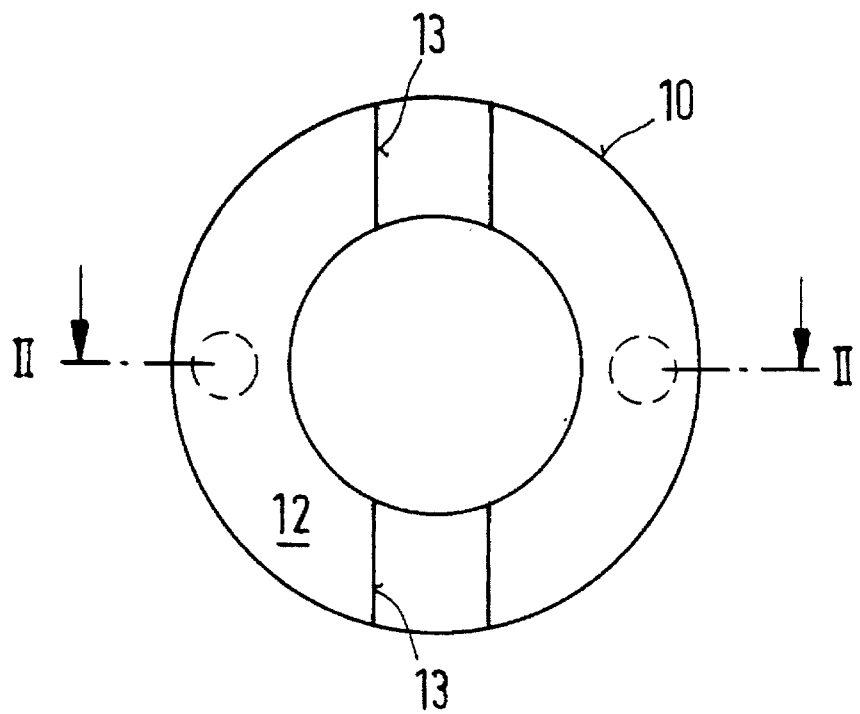
FIG. 7 is a front view of the ring-shaped movable joint member seen from the annular end face provided with the prismatic radial/recesses.
Figure 8:
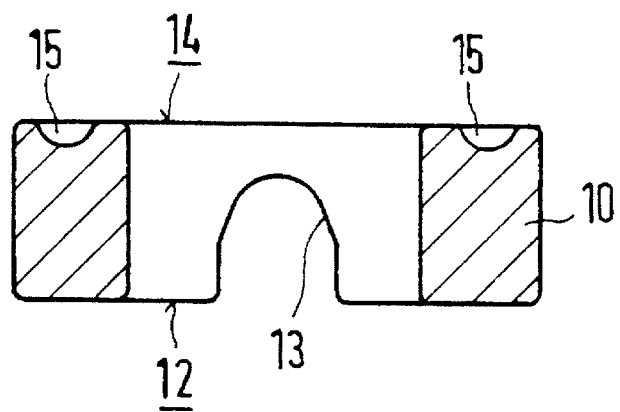
FIG. 8 is a top view of the ring of FIG. 7 taken along sectional line II—II.

The ring 10 shown in more detail in FIGS. 7 and 8 has in an annular end face 12 facing away from the stationary joint member 7 two diametrically oppositely arranged prismatic radial recesses 13, and in its annular end face 14 facing the stationary joint member 7, the ring 10 has two essentially spherical locking recesses 15. As is apparent from FIGS. 4 and 6, the locking recesses 15 cooperate with two balls 16 which are pressed into the front annular end face of the stationary joint member 7, such that the locking recesses 15 and the balls 16 form a ball snap-in connection of the swivel joint 4.

The sleeve 8 has wall openings 17 in the form of axial oblong holes which are arranged in alignment opposite each other. Only one of the wall openings 17 is visible in FIGS. 4 and 6. Together with the wall opening 17, the ring 10 placed on the sleeve 8 forms with its forwardly open prismatic radial recesses 13 a passage for the leg 3 in the joint 4, wherein the leg 3 extends through the sleeve at the wall opening 17 and is pressed into the prismatic radial recesses 13 forming receiving means for the leg 3. This is the case when the knurled nut 11 is screwed onto the external threaded portion 9 of the sleeve 8. The necessary pretension is produced by a pressure spring 18 which is arranged on the sleeve 8 and rests against the leg 3, on the one hand, and against the knurled nut 11, on the other hand. As shown in FIG. 3, a plastic disk 19 resting against the leg 3 is arranged between the ring 10 and the knurled nut 11. When the knurled nut 11 is screwed on, the plastic disk 19 transmits the clamping force onto the leg 3.

The clamped position of operation of the swivel joint 4 and, thus, of the leg 3 is shown in FIGS. 3 and 4. FIG. 4 shows that in the clamped position the balls 16 of the stationary joint member 7 are in engagement with the locking recesses 15 in the annular end face of the ring 10 facing the balls 16, so that, when the knurled nut 11 is tightened, not only the swivel joint 4 but also the leg 3 is secured so as to be immovable. If the leg 3 is to be swiveled toward the resonator shell 2 of the percussion instrument, as illustrated in FIG. 1, and/or the leg 3 is to be displaced within the swivel joint 4, it is merely necessary to release the knurled nut 11, i.e., to unscrew the knurled nut 11 on the external threaded portion 9 of the sleeve 8 at least to such an extent that the frictional connection or engagement between the knurled nut 11, the plastic disk 19 and the leg 3 is canceled. The leg 3 can then be displaced in its longitudinal direction into a desired position, as indicated by double arrow 20 in FIG. 5. When the knurled nut 11 is unscrewed further, the tensioning force of the pressure spring 11 further decreases, and it is then easily possible by swiveling the leg 3 to release the ring 10 from the locking connection with the stationary joint member 7.

FIGS. 5 and 6 of the drawing show the swivel joint 4 in the released position for displacing and simultaneously swiveling the leg 3 in the swiveling direction indicated by arrow 21 in FIG. 5. When the leg 3 is swiveled, the ring 10 rotates together with the sleeve 8 which is arranged in the stationary joint member 7 and the knurled nut 11, wherein the balls 16 travel on the annular end face 14 of the ring 10 facing the ball until, in the completely swiveled end position of the leg 3 shown in FIG. 1, the balls again engage in the locking recesses 15 and further swiveling is prevented. Accordingly, the snap-in connection composed of balls 16 and locking recesses 15 also defines the swivel end positions of the leg 3.

The invention is not limited by the embodiment described above which is presented as an example only but can be modified in various ways within the scope of protection defined by the appended patent claims.

We claim:

1. A swivel joint for securing an essentially rod-shaped object to a device, the swivel joint comprising a stationary joint member and a rotatable joint member rotatable relative to the stationary joint member, further comprising a clamping device for clamping the rotatable joint member relative to the stationary joint member, wherein the clamping device further comprises a sleeve rotatably mounted in the stationary joint member, the rotatable joint member being a ring, the ring being slid onto the sleeve, the sleeve having a wall, the wall defining wall openings, the ring having an annular end face facing away from the stationary joint member, the annular end face defining diametrically oppositely arranged prismatic radial recesses corresponding to the wall openings, whereby, when the radial recesses and the wall openings are in an aligned position, the rod-shaped object can be inserted into the swivel joint, such that the rod-shaped object extends through the radial recesses of the ring and the wall openings of the sleeve, the ring having another annular end face facing and being directly engageable with the stationary joint member, further comprising a locking connection between the other end face of the ring and the stationary joint member.

2. The swivel joint according to claim 1, wherein the sleeve has a free end, the free end having an external threaded portion, further comprising a knurled nut configured to be screwed onto the threaded portion of the sleeve, and a pressure element mounted between the rod-shaped object and the knurled nut for biasing the knurled nut.

3. The swivel joint according to claim 2, wherein the pressure element is a pressure spring.

4. The swivel joint according to claim 2, further comprising a plastic disk mounted on the sleeve between the ring and the knurled nut.

5. The swivel joint according to claim 1, wherein the locking connection comprises recesses in one of the joint members and balls on another of the joint members for engagement in the recesses.

* * * * *